United States Patent Office 3,517,056
Patented June 23, 1970

3,517,056
PROCESS FOR THE PRODUCTION OF 2,3,6-TRI-
CHLOROPHENYLACETIC ACID
Joseph F. DeGaetano, Montvale, N.J., assignor to Tenneco Chemicals, Inc., a corporation of Delaware
No Drawing. Filed Aug. 12, 1965, Ser. No. 479,306
Int. Cl. C07c 51/08
U.S. Cl. 260—515                                  8 Claims

ABSTRACT OF THE DISCLOSURE

Trichlorophenylacetic acid that contains at least 75 percent of the 2,3,6-isomer is prepared by a process in which trichlorotoluene that contains 60–70% of 2,3,6-trichlorotoluene is chlorinated until an average of about 1.1 to 1.5 atoms of chlorine has been introduced into the side chain to form a chlorination mixture that contains a major amount of trichlorobenzyl chloride, this mixture is cyanated to convert the trichlorobenzyl chlorides therein to trichlorobenzyl cyanides, and the trichlorobenzyl cyanides are hydrolyzed to trichlorophenylacetic acids.

This invention relates to a process for the production of trichlorophenylacetic acid. More particularly, it relates to a process for the production of trichlorophenylacetic acid containing an unusually large amount of 2,3,6-trichlorophenylacetic acid.

Trichlorophenylacetic acid is widely used as a soil sterilant and as a selective herbicide, for example, in the control of annual weeds and grasses in sugar cane. Since 2,3,6-trichlorophenylacetic acid is the only trichlorophenylacetic acid isomer that shows strong herbicidal activity, the value of a trichlorophenylacetic acid product as a herbicide is directly related to its 2,3,6-isomer content. Trichlorophenylacetic acid is ordinarily marketed as a mixture of chlorophenylacetic acids containing about 45–55 percent of the active 2,3,6-trichlorophenylacetic acid, 40–50 percent of other trichlorophenylacetic acid isomers, and small amounts of dichlorophenylacetic acids and tetrachlorophenylacetic acids. Trichlorophenylacetic acid of higher 2,3,6-isomer content would be more desirable commercially since a higher concentration of the 2,3,6-isomer per gallon of herbicidal solution could be obtained, which would result in greater ease and economy of handling. In addition, the application of a solution containing a smaller amount of non-herbicidal materials would bring about more uniform and predictable herbicidal activity. Various procedures have been suggested for increasing the 2,3,6-isomer content of trichlorophenylacetic acid products and for isolating 2,3,6-trichlorophenylacetic acid, but because these procedures add appreciably to the cost of the herbicide, their use is usually not commercially feasible.

It is an object of this invention to provide a process for the production of trichlorophenylacetic acid that contains at least 75 percent of the 2,3,6-isomer. It is a further object to provide a process for the production of side-chain chlorinated trichlorotoluene that can be readily converted to trichlorophenylacetic acid that contains at least 75 percent of the 2,3,6-isomer. Still another object is to provide an economical process for the conversion of trichlorotoluene containing 60 to 70 percent of 2,3,6-trichlorotoluene to trichlorophenylacetic acid containing at least 75 percent of 2,3,6-trichlorophenylacetic acid. Additional objects will be apparent from the detailed description of the invention that follows.

These objects may be achieved in accordance with the present invention by chlorinating trichlorotoluene that contains about 60 to 70 percent of 2,3,6-trichlorotoluene until an average of about 1.1 to 1.5 atoms and preferably 1.2 to 1.3 atoms of chlorine has been introduced into the side chain thereby forming a chlorination mixture that contains a major amount of trichlorobenzyl chlorides and a minor amount of trichlorobenzal chlorides, and cyanating this mixture to convert the trichlorobenzyl chlorides therein to trichlorobenzyl cyanides which are then hydrolyzed to yield trichlorophenylacetic acid that contains at least 75 percent and preferably 80 percent or more of 2,3,6-trichlorophenylacetic acid.

In the practice of this invention, toluene or orthochlorotoluene is chlorinated in the presence of a nuclear chlorination catalyst, such as iron, ferric chloride, antimony chloride, zirconium tetrachloride, and the like, at a temperature in the range of about 0° C. to 60° C. until the reaction mixture contains an average of about 2.5 to 3.0 gram atoms of chlorine per mole. Ortho-chlorotoluene is the preferred starting material in this process because it yields a mixture of trichlorotoluenes that is substantially free of isomers having a chlorine atom in the para position of the aromatic ring and that contains a maximum amount of 2,3,6-trichlorotoluene. The nuclear-chlorinated toluene is fractionated to separate a trichlorotoluene fraction that contains about 60 to 70 percent of 2,3,6-trichlorotoluene from the dichlorotoluenes and tetrachlorotoluenes that are present.

The trichlorotoluene fraction is then chlorinated in the absence of a chlorination catalyst or in the presence of light or a side-chain chlorination catalyst, such as benzoyl peroxide or phosphorus pentachloride, at a temperature in the range of about 100° to 220° C. until an average of about 1.1 to 1.5 gram atoms of chlorine has reacted per mole of trichlorotoluene. The resulting chlorination mixtures, which have specific gravities in the range of 1.545 to 1.580, contain about 65 to 80 percent by weight of trichlorobenzyl chlorides, 15 to 30 percent by weight of trichlorobenzal chlorides, and 1 to 10 percent by weight of trichlorotoluene. Particularly advantageous results have been obtained when the chlorination was continued until an average 1.2 to 1.3 atoms of chlorine were introduced into the side chain to form reaction mixtures that had specific gravities in the range of 1.550 to 1.560 and that contained more than 70 percent trichlorobenzyl chlorides.

When the trichlorotoluene is chlorinated until an average of only about 0.3 to 1.0 chlorine atom has been introduced into the side chain, as is taught by the prior art processes for the production of trichlorophenylacetic acid, the chlorination mixture obtained contains appreciable amounts of unreacted trichlorotoluene which must be recovered and recycled. When such a mixture is subjected to the cyanation and hydrolysis steps hereinafter described, a mixture of trichlorophenylacetic acids is obtained that contains less than about 55 percent of the herbicidally-active 2,3,6-isomer. Side-chain chlorination of the trichlorotoluene beyond the specified level, that is, until an average of more than 1.5 atoms of chlorine is introduced into the side chain, results in a substantial reduction in the total yield of trichlorophenylacetic acid from trichlorotoluene as well as in the yield of 2,3,6-trichlorophenylacetic acid from 2,3,6-trichlorotoluene.

While the chlorination mixture may be fractionated to separate the trichlorobenzyl chlorides from the trichlorobenzal chlorides and trichlorotoluene that are present, such purification generally has a detrimental effect on the overall yield of trichlorophenylacetic acid since trichlorobenzyl chlorides tend to undergo resinification and decomposition on distillation. It is therefore more economical as well as more convenient to subject the entire chlorination mixture to the subsequent cyanation and hydrolysis steps of this procedure. When this is done, the trichlorobenzyl chlorides in the chlorination mixture are converted to the corresponding trichlorophenylacetic acids which may then be readily separated from the trichlorobenzal chlorides, which do not undergo any reaction. Since in the side-chain chlorination step the 2,6- substituted trichlorotoluenes are chlorinated principally to the trichlorobenzyl chloride stage, whereas the non-2,6-substituted trichlorotoluenes are converted to the corresponding trichlorobenzal chlorides, it is possible by means of the present procedure to obtain trichlorophenylacetic acid that has a substantially higher 2,3,6-isomer content than that of the trichlorotoluene from which it is derived.

The trichlorobenzyl chlorides in the chlorination mixture may be converted to the corresponding trichlorophenylacetic acids by reactions that are well known in the art. The chlorination mixture may be treated with an alkali metal cyanide, usually sodium cyanide, in a solvent, such as methanol, ethanol, or isopropanol, to form a cyanation mixture that contains trichlorobenzyl cyanides. Following removal of the solvent and inorganic salts, the cyanation mixture may be hydrolyzed with either an alkali metal hydroxide or a strong mineral acid to convert the trichlorobenzyl cyanides to trichlorophenylacetic acids. Because it gives a high yield of trichlorophenylacetic acid in a relatively short time, sulfuric acid is ordinarily used to effect hydrolysis. The hydrolysis reaction may be carried out by heating the cyanation mixture with a stoichiometric excess of 60–90 percent sulfuric acid at a temperature in the range of about 125° to 200° C. for 1 to 12 hours. Exceptionally high yields of trichlorophenylacetic acid have been obtained by heating the cyanation mixture with 3.5 to 4.0 parts by weight of 60 percent sulfuric acid per part by weight of the cyanation mixture at about 135° C. for 6 hours.

Any suitable and convenient procedure may be used for the isolation and purification of the product. For example, the crude hydrolysis mixture may be diluted with water and the resulting aqueous layer, which contains unreacted sulfuric acid and inorganic salts separated from the organic layer. The organic layer may be neutralized, for example, with aqueous sodium hydroxide solution to form a solution of sodium trichlorophenylacetate which may then be treated with activated carbon to remove tars and with a water-immiscible solvent, such as benzene or trichloroethylene, to remove unreacted trichlorotoluene, trichlorobenzyl chloride, and other organic impurities from it. Acidification of the sodium salt solution results in precipitation of the free trichlorophenylacetic acid, which may be recovered by filteration and dried. The product obtained is a mixture of trichlorophenylacetic acids that contains at least 75 percent and in most cases 80 percent or more of 2,3,6-trichlorophenylacetic acid.

The invention is further illustrated by the examples that follow.

EXAMPLE 1

A mixture of 2000 grams of o-chlorotoluene and 10 grams of iron powder was chlorinated by passing a stream of gaseous chlorine over its surface at the rate of about 75 grams an hour until the weight of the reaction mixture had increased by 1010 grams. During the chlorination, the reaction mixture was stirred, and external cooling was required to maintain its temperature in the range of 20° to 35° C. The reaction mixture was washed with two 500 ml. portions of water and then distilled under vacuum to yield 2185 grams of trichlorotoluene that contained 63.1 percent of 2,3,6-trichlorotoluene.

A mixture of 665 grams (3.4 moles) of this trichlorotoluene and 0.25 ml. of a 10% solution of benzoyl peroxide in chloroform was chlorinated by passing a stream of chlorine below its surface at the rate of 100 grams per hour until a weight increase of 117 grams was attained. During the chlorination the temperature of the reaction mixture was maintained at 100° to 110° C., and additional 0.25 ml. portions of the 10% benzoyl peroxide solution were added at 30 minute intervals.

When the chlorination had been completed, a stream of air was passed through the reaction mixture which was maintained at 100° C. for 30 minutes to remove dissolved chlorine and hydrogen chloride. There was obtained 802 grams of a chlorinated mixture that contained 1.8 percent of trichlorotoluene, 74.8 percent of trichlorobenzyl chlorides (67.4 percent of 2,3,6-trichlorobenzyl chloride), and 23.4 percent of trichlorobenzal chlorides.

Eight hundred grams of this chlorinated mixture was heated at its reflux temperature for 6 hours with 810 grams of methanol, 248 grams of sodium cyanide, and 100 grams of water. The reaction mixture was then heated to 90° C. to distill off the methanol. After washing with 800 ml. of water, there was obtained 805 grams of crude trichlorobenzyl cyanide.

Hydrolysis of the crude trichlorobenzyl cyanide was accomplished by heating it at its reflux temperature (135° C.) for 6 hours with 3000 grams of 60 percent sulfuric acid, adding 200 ml. of water, cooling the resulting mixture, and separating the solidified organic acid from the sulfuric acid layer. The trichlorophenylacetic acid was thoroughly washed with water and neutralized to pH 6.5 with 425 grams of 20 percent sodium hydroxide solution. The resulting aqueous solution was decanted away from the tars and diluted with water to a total volume of 8930 ml. The resulting solution was treated with 10 grams of activated carbon and 10 grams of filter aid to yield 9250 grams of a sodium trichlorophenylacetate solution that contained 5.53 percent of extractable acid and that had a specific gravity of 1.034 at 25° C.

Following concentration of this solution to a specific gravity of 1.204 at 25° C. and adjustment of the pH of the concentrated salt solution to 7.5 with sodium hydroxide, there was obtained 1570 grams of a solution that contained 32.56 percent of extractable acid (79.9 percent of 2,3,6-trichlorophenylacetic acid), which is equivalent to 2.61 pounds of 2,3,6-trichlorophenylacetic acid per gallon of solution.

EXAMPLE 2

To demonstrate the relationship between the degree of side-chain chlorination of trichlorotoluene and the 2,3,6-trichlorophenylacetic acid content of the product, a series of reactions was carried out in which trichlorotoluene which contained 63 percent of the 2,3,6-isomer was chlorinated until an average of 0.3 to 1.5 atoms of chlorine had been introduced into the side chain. The resulting chlorination mixtures were then converted to trichlorophenylacetic acid by the procedure described in Example 1. The results of these tests are summarized in Table I.

TABLE I.—EFFECT OF DEGREE OF SIDE CHAIN-CHLORINATION ON 2, 3, 6-ISOMER CONTENT OF PRODUCT

| Example No. | 2A | 2B | 2C | 2D | 2E | 2F | 2G | 2H |
|---|---|---|---|---|---|---|---|---|
| Average No. of Cl atoms in side-chain | 0.5 | 0.8 | 0.9 | 1.0 | 1.1 | 1.2 | 1.3 | 1.4 |
| Sp. Gr. at 25° C. of chlorination mixture | 1.49 | 1.51 | 1.52 | 1.534 | 1.548 | 1.555 | 1.561 | 1.572 |
| Percent trichlorobenzyl chlorides in chlorination mixture | 47.6 | 65.7 | 71.7 | 77.7 | 79.3 | 74.8 | 72.3 | 59.0 |
| Yield (percent based on trichlorotoluene) of trichlorophenylacetic acid | 42.0 | 44.3 | 48.0 | 58.5 | 62.7 | 64.3 | 59.7 | 52.5 |
| 2,3,6-isomer content of trichlorophenylacetic acid | 36.8 | 37.5 | 54.1 | 72.4 | 77.5 | 80.0 | 85.6 | 87.1 |
| Yield (percent based on 2,3,6-trichlorotoluene) of 2,3,6-trichlorophenylacetic acid | 22.1 | 24.5 | 42.3 | 63.0 | 76.9 | 81.4 | 81.0 | 72.5 |

Trichlorotoluene that contained 65 percent of the 2,3,6-isomer was chlorinated by heating it at 200°–210° C. while a stream of chlorine was passed below its surface until the specific gravity of the chlorination mixture was 1.556 at 25° C. The mixture was then maintained at 100° C. for 30 minutes while a stream of air was passed through it to remove dissolved chlorine and hydrogen chloride. The resulting chlorination mixture contained 77 percent of trichlorobenzyl chlorides, 21 percent of trichlorobenzal chlorides, and 2 percent of trichlorotoluene.

Two hundred grams of the chlorinated mixture was heated with 50 grams of water, 405 grams of methanol, and 62 grams of 95 percent sodium cyanide at the reflux temperature of the mixture for 6 hours. The mixture was cooled to room temperature and filtered. The filtrate was heated to 90° C. to distill off the methanol. The residue was then washed with two 250 gram portions of water at 50°–60° C. to remove inorganic salts.

The resulting crude trichlorobenzyl cyanide was hydrolyzed by heating it at 170°–180° C. for one hour with 750 grams of 75 percent sulfuric acid. After cooling, the solidified organic acid was separated from the sulfuric acid layer, washed with 1100 grams ofw ater, and treated with 700 grams of 5 percent sodium hydroxide solution.

The resulting solution was treated with activated carbon and filter aid and acidified to pH 2 to yield 132 grams of trichlorophenylacetic acid, which melted at 118–148° C. and which contained 80.4 percent of 2,3,6-trichlorophenylacetic acid.

This invention has been disclosed as a method for the production of trichlorophenylacetic acid containing at least 75 percent of the 2,3,6-isomer. It can also be applied to the production of other polychlorophenylacetic acids that contain an unusually large amount of isomers having chlorine in at least the 2- and 6-positions of the aromatic ring. For example, it can be used in the preparation of dichlorophenylacetic acid containing a major amount of the 2,6-isomer from dichlorotoluene containing 50 to 60 percent of 2,6-dichlorotoluene ad in the preparation of tetrachlorophenylacetic acid containing a major amount of the 2,3,5,6-isomer from tetrachlorotoluene containing 40 to 50 percent of 2,3,5,6-tetrachlorotoluene. These 2,6-polychlorophenylacetic acids, like 2,3,6-trichlorophenylacetic acid, have been found to be useful as selective herbicides.

The terms and expressions which have been employed are used as terms of description and not of limitation, and there is no intention in the use of such terms and expressions of excluding any equivalents of the features shown and described or portions thereof, but it is recogniized that various modifications are possible within the scope of the invention claimed.

What is claimed is:

1. In a proces for the production of trichlorophenylacetic acid containing at least 75 percent of the 2,3,6-isomer wherein trichlorotoluene containing 60 to 70 percent of 2,3,6-trichlorotoluene is side-chain chlorinated to form a chlorination mixture, the chlorination mixture reacted with an alkali metal cyanide to form a cyanation mixture, and the cyanation mixture hydrolyzed to form trichlorophenylacetic acid, the improvement that comprises carrying out the chlorination of trichlorotoluene until an average of 1.1 to 1.5 atoms of chlorine has been introduced into the side chain.

2. In a process for the production of trichlorophenylacetic acid containing at least 75 percent of the 2,3,6-isomer wherein trichlorotoluene containing 60 to 70 percent of 2,3,6-trichlorotoluene is side-chain chlorinated to form a chlorination mixture, the chlorination mixture reacted with an alkali metal cyanide to form a cyanation mixture, and the cyanation mixture hydrolyzed to form trichlorophenylacetic acid, the improvement that comprises carrying out the chlorination of trichlorotoluene until an average of 1.2 to 1.3 atoms of chlorine has been introduced into the side chain.

3. A process for the production of trichlorophenylacetic acid containing at least 75 percent of 2,3,6-trichlorophenylacetic acid which comprises the steps of nuclear chlorinating o-chlorotoluene until the chlorination mixture contains an average of about 2.5 to 3.0 gram atoms of chlorine per mole, separating from the chlorination mixture a trichlorotoluene fraction that contains about 60 to 70 percent of 2,3,6-trichlorotoluene, chlorinating said trichlorotoluene fraction until an average of about 1.1 to 1.5 atoms of chlorine has been introduced into the side chain, treating the resulting chlorination product with an alkali metal cyanide to form a cyanation mixture, hydrolyzing said cyanation mixture with a material selected from the group consisting of an alkali metal hydroxide and a strong mineral acetic to form a hydrolysis product, and thereafter recovering trichlorophenylacetic acid from said hydrolysis product.

4. The process that comprises the steps of chlorinating o-chlorotoluene until the chlorination mixture contains an average of about 2.5 to 3.0 gram atoms of chlorine per mole, separating from the chlorination mixture by fractional distillation a trichlorotoluene fraction that contains about 60 to 70 percent of 2,3,6-trichlorotoluene, and chlorinating said trichlorotoluene fraction until an average of 1.2 to 1.3 atoms of chlorine has been introuced into the side chain thereby forming a product that contains at least 70 percent by weight of trichlorobenzyl chlorides.

5. In the process set forth in claim 1, the further improvement that comprises hydrolyzing the cyanation mixture with a material selected from the group consisting of alkali metal hydroxides and strong mineral acids.

6. In the process set forth in claim 2, the further improvements that comprise reacting the chlorination mixture with sodium cyanide to form a cyanation mixture and treating said cyanation mixture with sulfuric acid to form a hydrolysis product that contains trichlorophenyl acid.

7. The process of claim 3 wherein the chlorination of the trichlorotoluene fraction is continued until an average of 1.2 to 1.3 atoms of chlorine has been introduced into the side chain, the resulting chlorination product is treated with sodium cyanide to form a cyanation mixture, and the cyanation mixture is hydrolyzed with sulfuric acid to form a product containing at least 75% of 2,3,6-trichlorophenylacetic acid.

8. The process wherein the hydrolysis product of claim 5 is neutralized with aqueous sodium hydroxide to form an aqueous solution of sodium 2,3,6-trichlorophenylacetate.

References Cited

UNITED STATES PATENTS

| | | | |
|---|---|---|---|
| 2,977,212 | 3/1961 | Tischler | 260—515 |
| 2,980,732 | 4/1961 | Girard et al. | 260—515 |
| 3,225,087 | 12/1965 | Dorfman et al. | 260—651 |

JAMES A. PATTEN, Primary Examiner

U.S. Cl. X.R.

71—115; 260—465, 651